United States Patent
Takeda et al.

(10) Patent No.: US 10,355,499 B2
(45) Date of Patent: Jul. 16, 2019

(54) BATTERY PROTECTION CIRCUIT, BATTERY PROTECTION APPARATUS, AND BATTERY PACK

(71) Applicants: Takashi Takeda, Tokyo (JP); Ryota Kageyama, Tokyo (JP); Koichi Murano, Tokyo (JP); Junji Takeshita, Tokyo (JP); Takeshi Yamaguchi, Tokyo (JP); Takatoshi Itagaki, Tokyo (JP); Koji Yano, Tokyo (JP)

(72) Inventors: Takashi Takeda, Tokyo (JP); Ryota Kageyama, Tokyo (JP); Koichi Murano, Tokyo (JP); Junji Takeshita, Tokyo (JP); Takeshi Yamaguchi, Tokyo (JP); Takatoshi Itagaki, Tokyo (JP); Koji Yano, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/876,918

(22) Filed: Oct. 7, 2015

(65) Prior Publication Data
US 2016/0118821 A1    Apr. 28, 2016

(30) Foreign Application Priority Data

Oct. 22, 2014  (JP) .................................. 2014-215109

(51) Int. Cl.
*H02J 7/00* (2006.01)
*H01M 10/42* (2006.01)
(Continued)

(52) U.S. Cl.
CPC ......... *H02J 7/0031* (2013.01); *H01M 10/425* (2013.01); *H01M 10/44* (2013.01);
(Continued)

(58) Field of Classification Search
CPC ............ H02J 7/0026; H02J 2007/0037; H02J 2007/0039; H02J 2007/004; H01M 10/4257
(Continued)

(56) References Cited

U.S. PATENT DOCUMENTS 4,972,375 A * 11/1990 Ueno ...................... G11C 17/18
365/189.11
5,278,794 A * 1/1994 Tanaka ............... G11C 16/0483
365/185.09
(Continued)

FOREIGN PATENT DOCUMENTS

JP    2000-276461    10/2000
JP    2009-152129    7/2009
(Continued)

OTHER PUBLICATIONS

Japanese Office Action dated Oct. 6, 2015.

*Primary Examiner* — David V Henze-Gongola
*Assistant Examiner* — Tarikh Kanem Rankine
(74) *Attorney, Agent, or Firm* — IPUSA, PLLC

(57) ABSTRACT

A battery protection circuit for protecting a secondary battery, the battery protection circuit not having a CPU, includes a non-volatile memory into which characteristics data determining protective characteristics of the battery protection circuit are writable; and a protection operation circuit which performs a protection operation of the secondary battery based on the characteristics data read out of the non-volatile memory.

19 Claims, 6 Drawing Sheets

(51) Int. Cl.
*H01M 10/44* (2006.01)
*H01M 10/48* (2006.01)

(52) U.S. Cl.
CPC .......... *H01M 10/443* (2013.01); *H01M 10/48* (2013.01); *H01M 10/486* (2013.01); *H02J 2007/0037* (2013.01)

(58) Field of Classification Search
USPC ................................................. 320/134, 136
See application file for complete search history.

(56) References Cited

U.S. PATENT DOCUMENTS

| | | | | |
|---|---|---|---|---|
| 5,282,174 | A * | 1/1994 | Little | G11C 8/16 365/189.04 |
| 5,297,097 | A * | 3/1994 | Etoh | G11C 5/147 327/530 |
| 5,381,369 | A * | 1/1995 | Kikuchi | G11C 16/22 365/185.04 |
| 5,493,197 | A * | 2/1996 | Eguchi | H02J 7/0026 320/116 |
| 5,691,948 | A * | 11/1997 | Sakabe | G11B 19/06 365/226 |
| 6,098,164 | A * | 8/2000 | Nagatome | G06F 13/4213 711/167 |
| 6,208,117 | B1 * | 3/2001 | Hibi | H02J 7/0021 320/134 |
| 6,316,915 | B1 * | 11/2001 | Fujiwara | H02J 7/0031 320/134 |
| 6,377,502 | B1 * | 4/2002 | Honda | G11C 8/12 365/185.11 |
| 7,016,231 | B2 * | 3/2006 | Kubo | G11C 5/147 365/185.18 |
| 8,880,913 | B2 * | 11/2014 | Holsen | G06F 1/263 361/1 |
| 2001/0040821 | A1 * | 11/2001 | Tanaka | G11C 7/1006 365/185.03 |
| 2002/0045952 | A1 * | 4/2002 | Blemel | G05B 19/042 19/42 |
| 2002/0071308 | A1 * | 6/2002 | Muranaka | G11C 11/5692 365/185.03 |
| 2002/0089318 | A1 * | 7/2002 | Armstrong, II | G05F 1/56 323/285 |
| 2003/0007388 | A1 * | 1/2003 | Kawai | G11C 16/0483 365/185.22 |
| 2004/0057283 | A1 * | 3/2004 | Cernea | G11C 7/1006 365/185.11 |
| 2004/0060031 | A1 * | 3/2004 | Cernea | G11C 7/06 365/185.23 |
| 2006/0170398 | A1 * | 8/2006 | Gangsto | H02J 7/0016 320/132 |
| 2008/0082873 | A1 * | 4/2008 | Russell | G11C 5/147 714/721 |
| 2008/0290835 | A1 * | 11/2008 | Hayashi | H01M 2/1022 320/112 |
| 2009/0073740 | A1 * | 3/2009 | Ogura | G11C 11/412 365/72 |
| 2009/0160405 | A1 | 6/2009 | Takeda et al. | |
| 2009/0251104 | A1 * | 10/2009 | Yamamoto | H01M 10/44 320/134 |
| 2010/0327841 | A1 * | 12/2010 | Ito | G11C 5/147 323/313 |
| 2011/0267726 | A1 | 11/2011 | Ikeuchi et al. | |
| 2011/0273804 | A1 * | 11/2011 | Ikeuchi | H02J 7/0031 361/63 |
| 2012/0212185 | A1 * | 8/2012 | Tanaka | H02J 7/0021 320/136 |
| 2013/0257379 | A1 * | 10/2013 | Kato | H02J 7/0029 320/128 |
| 2014/0173300 | A1 * | 6/2014 | Yamazaki | H02J 7/0004 713/300 |
| 2014/0313812 | A1 * | 10/2014 | Yim | G11C 13/0069 365/148 |

FOREIGN PATENT DOCUMENTS

| | | |
|---|---|---|
| JP | 2010-187532 | 8/2010 |
| JP | 2011-153952 | 8/2011 |
| JP | 2011-239652 | 11/2011 |
| JP | 2012-173063 | 9/2012 |

* cited by examiner

BATTERY PROTECTION CIRCUIT, BATTERY PROTECTION APPARATUS, AND BATTERY PACK

CROSS-REFERENCE TO RELATED APPLICATIONS

This patent application is based upon and claims the benefit of priority of Japanese Patent Application No. 2014-215109 filed on Oct. 22, 2014, the entire contents of which are incorporated herein by reference.

BACKGROUND OF THE INVENTION

1. Field of the Invention

The present invention relates to a battery protection circuit, a battery protection apparatus, and a battery pack.

2. Description of the Related Art

An example is given of a battery protection circuit of protecting a secondary battery that is not provided with a CPU (for example, see Patent Document 1).

[Patent Document 1] Japanese Laid-open Patent Publication No. 2011-239652

SUMMARY OF THE INVENTION

Protective characteristics of a battery protection circuit needs to be customized depending on the kind of the secondary battery or the kind of a product, into which the battery protection circuit is installed. If structures of the battery protection circuits are developed for each kind of the secondary batteries or the products so as to be able to deal with multiple different protective characteristics, the lead time and cost for the development are apt to increase.

The object of an embodiment of the present invention is to provide a battery protection circuit, a battery protection apparatus, and a battery pack, which can deal with the multiple protective characteristics by using a common circuit structure.

According to an aspect of the embodiment, there is provided a battery protection circuit for protecting a secondary battery, the battery protection circuit not having a CPU, including a non-volatile memory into which characteristics data determining protective characteristics of the battery protection circuit are writable; and a protection operation circuit which performs a protection operation of the secondary battery based on the characteristics data read out of the non-volatile memory.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF EMBODIMENTS

A description of embodiments of the present invention is given below, with reference to the FIG. 1 through FIG. 6.

Figure 1:
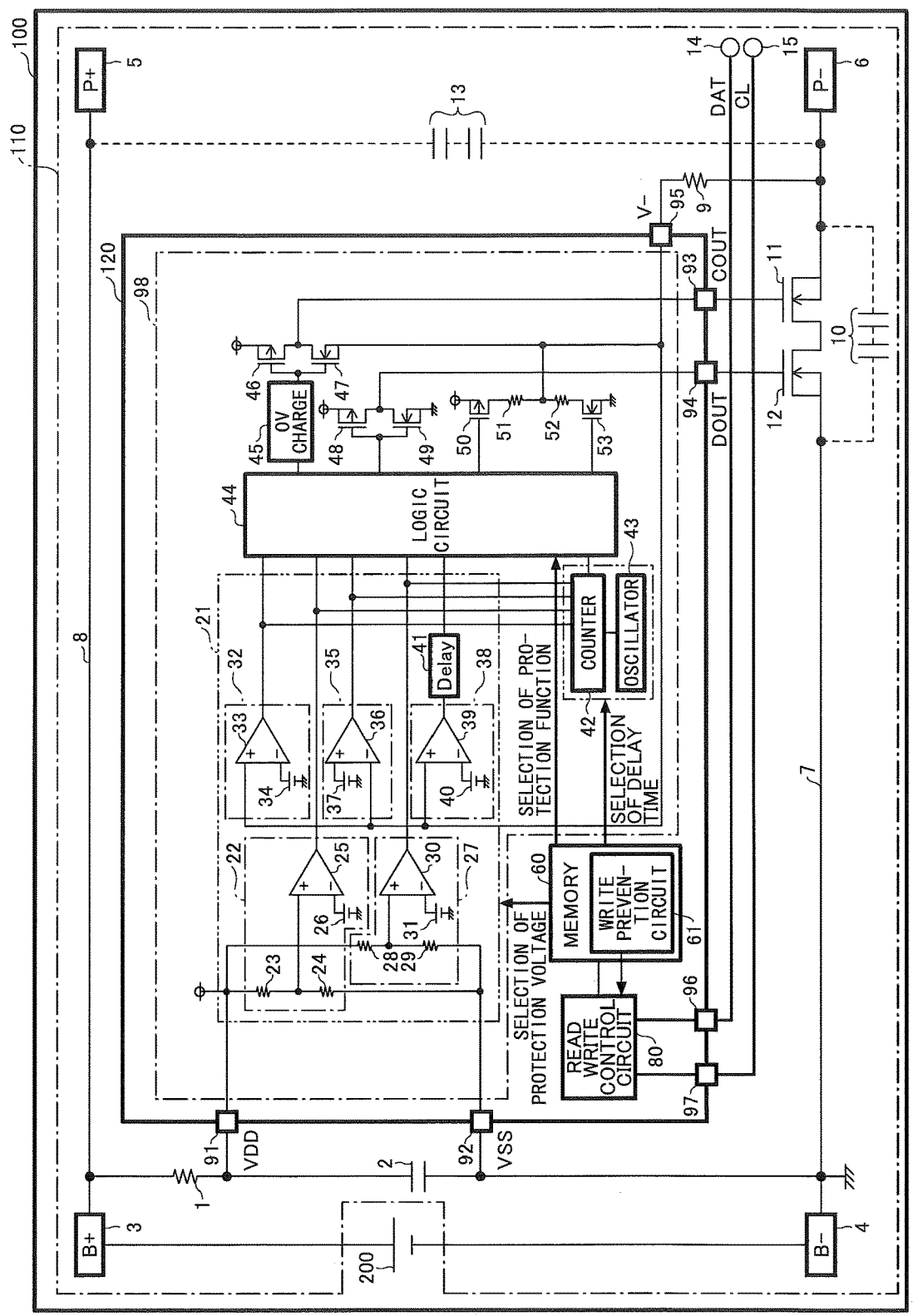
FIG. 1 illustrates a structure of an exemplary battery pack.

Reference symbols typically designate as follows:
14: data input terminal
15: clock input terminal
21: error detection circuit
22: overcharge detection circuit
27: overdischarge detection circuit
32: discharge overcurrent detection circuit
35: charge overcurrent detection circuit
38: short-circuit detection circuit
44: logic circuit
60: memory
61: write prevention circuit
62: memory cell circuit
63: peripheral circuit
64: write circuit
65: read circuit
66: shift register
69: memory element
74: flip-flop
77: protection bit
80: read write control circuit
98: protection operation circuit
99: regulator
100, 101: battery pack
110, 111: battery protection apparatus
120, 121: battery protection circuit FIG. 1 illustrates a structure of the exemplary battery pack 100. In the battery pack 100, a secondary battery 200 which can supply a power to an external load (not shown) connected to load connection terminals 5 and 6 and a protection apparatus 110 which protects the secondary battery 200 are built in. The battery pack 100 may be built into the external load or attached to the outside of the external load. A specific example of the external load is a portable terminal device which can be carried. The portable terminal device is a mobile phone, a smartphone, a tablet-type computer, a game machine, a television set, a music and movie player, a camera or the like.

The secondary battery 200 can be charged by a charger (not illustrated) which is connected to the load connection terminals 5 and 6. An exemplary secondary battery 200 is a lithium-ion battery, a lithium polymer battery, or the like.

The protection apparatus 110 is an exemplary protection apparatus that has the load connection terminal 5, the load connection terminal 6, and the cell connection terminals 3 and 4 and protects the secondary battery 200 connected to the cell connection terminals 3 and 4 from an overcurrent. The cell connection terminal 3 is connected to the load connection terminal 5 through an electric power line 8. The cell connection terminal 4 is connected to the load connection terminal 6 through an electric power line 7. The cell connection terminal 3 is connected to a positive terminal of the secondary battery 200. The cell connection terminal 4 is connected to a negative terminal of the secondary battery 200.

The protection apparatus 110 includes transistors 11 and 12. The transistor 11 is an exemplary charging line cutoff part which can cut off a charging path of the secondary battery 200. The transistor 12 is an exemplary discharging line cutoff part which can cut off a discharging path of the secondary battery 200. Referring to FIG. 1, the transistor 1 cuts off the electric power line 7 through which a charging current for the secondary battery 200 flows. The transistor 12 cuts off the electric power line 7 through which a discharging current for the secondary battery 200 flows. The transistors 11 and 12 are switching elements for switching over conduction and cutoff of the electric power line 7. The transistors 11 and 12 are arranged in series and inserted into the electric power line 7.

The transistors 11 and 12 are, for example, a metal oxide semiconductor field effect transistor (MOSFET). The transistor 11 is inserted in the electric power line 7 so that a forward direction of a parasitic diode of the transistor 11 matches a discharge direction of the secondary battery 200. The transistor 12 is inserted in the electric power line 7 so that a forward direction of a parasitic diode of the transistor 12 matches the discharge direction of the secondary battery 200. A diode may be added between drains and sources of the transistors 11 and 12.

The protection apparatus 110 may include capacitors 10 and 13. The capacitors 10 and 13 are arranged in parallel and inserted between the transistors 11 and 12. The capacitor 13 has one end connected to the load connection terminal 5 and the other end connected to the load connection terminal 6. By providing the capacitor 10 or the capacitor 13, it is possible to improve a durability against a voltage variation and an external noise.

The protection apparatus 110 includes a protection circuit 120. The protection circuit 120 is an example of a battery protection circuit which protects the secondary battery 200 without providing a central processing unit (CPU) to the protection circuit 120. For example, the protection circuit 120 is an integrated circuit which is supplied with electricity from the secondary battery and protects the secondary battery 200. Because there is no CPU, the protection circuit 120 does not have a function of protecting the secondary battery 200 based on a processing result of the CPU of the protection circuit 120. Since there is no CPU, the protection circuit 120 does not have a residual quantity detecting function.

The protection circuit 120 includes, for example, a power source terminal 91, a ground terminal 92, a charge control terminal 93, a discharge control terminal 94, and a current detection terminal 95.

The power source terminal 91 is a positive terminal side power source terminal connected to the cell connection terminal 3 or the electric power line 8 through the resistor 1. The power source terminal 91 may be called a VDD terminal. The power source terminal 91 is connected to a connection point between another end of the electric power line 8 whose one end is connected to the electric power line 8 and another end of the capacitor whose one end is connected to the electric power line 7. The one end of the capacitor 2 is connected to the electric power line 7 between the cell connection terminal 4 and the transistor 12.

The ground terminal 92 is a negative terminal side power source terminal connected to the electric power line 7 between the cell connection terminal 4 and the transistor 12. The power source terminal 92 may be called a VSS terminal.

The charge control terminal 93 outputs a signal of prohibiting the secondary battery 200 from being charged. The charge control terminal 93 may be called a COUT terminal.

The charge control terminal 93 is connected to a control electrode of the transistor 11 (for example, a gate of a MOSFET).

The discharge control terminal 94 outputs a signal of prohibiting the secondary battery 200 from being discharged. The charge control terminal 94 may be called a DOUT terminal. The discharge control terminal 94 is connected to a control electrode of the transistor 12 (for example, a gate of a MOSFET).

The current detection terminal 95 inputs a detection voltage corresponding to a current flowing through the secondary battery 200, and may be referred to as a V− terminal. The current detection terminal 95 is connected through a resistor 7 to the electric power line 7 provided between the load connection terminal 6 and the transistor 11.

The protection circuit 120 includes a memory 60 and a protection operation circuit 98. The memory 60 is, for example, a non-volatile memory, into which characteristics data determining protective characteristics of a protection circuit 120 can be written. The memory 60 is specifically a one time programmable ROM (OTPROM) or an electrically erasable programmable ROM (EEPROM). The protection operation circuit 98 is an exemplary protection operation circuit performing a protection operation for the secondary battery 200 based on the characteristics data read from the memory 60.

Therefore, if the characteristics data written in the memory 60 change, the protection operation for the secondary battery can be changed. Therefore, a common circuit structure is applicable to multiple different protective characteristics. For example, if kinds of the secondary batteries 200 or kinds of products, in which the protection circuit 120 is installed, differ, the protection operation circuit 98 can be used in common.

Because the protection circuit 120 has the memory 60, in which the characteristics data are writable, a change of metal wiring of an IC chip or laser trimming of a fuse becomes unnecessary in customizing the protective characteristics, for example. Resultantly, a lead time of development or manufacture and a cost reduction is possible.

Because the characteristics data are written into the memory 60 by the protection circuit 120, the protection circuit 120 includes a data terminal 96, a clock terminal 97, and a read write control circuit 80.

The data terminal 96 and the clock terminal 97 are input terminals used to write the characteristics data. The data terminal 96 can input a characteristics data signal DAT of carrying the characteristics data to be written in the memory 60. The clock terminal 97 can input a clock signal CL.

The read write control circuit 80 controls to write the characteristics data to the memory 60 based on the characteristics data signal DAT and a clock signal CL. Further, the read write control circuit 80 controls to read the characteristics data written in the memory 60.

Because the protection circuit 120 includes the data terminal 96, the clock terminal 97, and the read write control circuit 80, the characteristics data can be written in the memory 60 in, for example, a pre-shipment check after providing a mold package for the protection circuit 120. Because the characteristics data can be written in the memory 60 after packaging, it is possible to prevent variation of the protective characteristics caused by the packaging.

Further, because the protection apparatus 110 writes data to the memory 60, the protection apparatus 110 may include a data input terminal 14 and a clock input terminal 15. The data input terminal 14 and the clock input terminal 15 are input terminals used to write the characteristics data. The data input terminal 14 can input the characteristics data signal DAT and is connected to the data terminal 96 from the outside of the protection circuit 120. The clock input terminal 15 can input the clock signal CL and is connected to the clock terminal 97 from the outside of the protection circuit 120.

Because the protection apparatus 110 includes the data input terminal 14 and the clock input terminal 15, the characteristics data can be written into the memory 60 in a pre-shipment check for the protection apparatus 110 after the protection circuit 120 and the transistors 11 and 12 are mounted on a substrate. Because the characteristics data can be written in the memory 60 after mounting the protection circuit 120 and the transistors 11 and 12 on the board, it is possible to prevent variation of the protective characteristics caused by the mounting.

The protection operation circuit 98 includes an error detection circuit 21 for detecting an error of a current or a voltage of the secondary battery 200 and a logic circuit 44 of controlling to turn on or off the transistors 11 and 12 based on a result of an error detection detected by the error detection circuit 21. For example, the error detection circuit 21 includes an overcharge detection circuit 22, an overdischarge detection circuit 27, a discharge overcurrent detection circuit 32, a charge overcurrent detection circuit 35, and a short-circuit detection circuit 38.

For example, the protection operation circuit 98 performs an operation (an overcharge protection operation) of protecting the secondary battery 200 from the overcharge. For example, the overcharge detection circuit 22 monitors the battery voltage (the cell voltage) of the secondary battery 200 by detecting the voltage between the power source terminal 91 and the ground terminal 92 using resistors 23 and 24. The overcharge detection circuit 22 detects the overcharge of the secondary battery 200 and outputs an overcharge detection signal when the cell voltage equal to or higher than an overcharge detection voltage Vdet1, which is set in response to threshold voltage data read out of the memory 60, is detected. The detection of the cell voltage equal to or higher than the overcharge detection voltage Vdet1 and the output of the overcharge detection signal are performed by using a reference voltage 26 and a comparator 25.

The logic circuit 44 performs an overcharge protection operation of outputting a control signal of a low level, which causes the transistor 11 to be turned off, after a passage of an overcharge detection delay time tVdet1, which is set in response to delay time data read out of the memory 60, after detecting the overcharge detection signal. It is possible to prevent the secondary battery 200 from being overcharged regardless of an on or off state of the transistor 12 when the transistor 11 is turned off. The logic circuit 44 causes the transistor 11 to be turned off by turning off the transistor 46 and turning on the transistor 47.

On the other hand, the overcharge detection circuit 22 outputs an overcharge recovery signal (or may stop the output of the overcharge detection signal) upon a recovery from an overcharge state to an ordinary state. The recovery from the overcharge state to the ordinary state is determined when the cell voltage equal to or smaller than an overcharge recovery voltage Vrel1, which is set in response the threshold voltage data read out of the memory, is detected. The overcharge recovery voltage Vrel1 is lower than the overcharge detection voltage Vdet1.

The logic circuit 44, which detects the overcharge recovery signal or detects the stopped output of the overcharge detection signal, outputs a control signal of a high level, which causes the transistor 11 to be turned on, from the charge control terminal 93. By turning on the transistor 11, the overcharge protection operation ends. The logic circuit 44 causes the transistor 11 to be turned on by turning on the transistor 46 and turning off the transistor 47.

For example, the protection operation circuit 98 performs an operation (an overdischarge protection operation) of protecting the secondary battery 200 from the overdischarge. For example, the overdischarge detection circuit 27 monitors the battery voltage (the cell voltage) of the secondary battery 200 by detecting the voltage between the power source terminal 91 and the ground terminal 92 using resistors 28 and 29. The overdischarge detection circuit 27 detects the overdischarge of the secondary battery 200 and outputs an overdischarge detection signal when the cell voltage equal to or higher than an overdischarge detection voltage Vdet2, which is set in response to threshold voltage data read out of the memory 60, is detected. The detection of the cell voltage equal to or lower than the overdischarge detection voltage Vdet2 and the output of the overdischarge detection signal are performed by using a reference voltage 31 and a comparator 25.

The logic circuit 44 performs an overdischarge protection operation of outputting a control signal of a low level, which causes the transistor 12 to be turned off, after a passage of an overdischarge detection delay time tVdet2, which is set in response to the delay time data read out of the memory 60, after detecting the overdischarge detection signal. It is possible to prevent the secondary battery 200 from being overdischarged regardless of the on or off state of the transistor 11 when the transistor 12 is turned off. The logic circuit 44 causes the transistor 12 to be turned off by turning off the transistor 48 and turning on the transistor 49.

On the other hand, the overdischarge detection circuit 27 outputs an overdischarge recovery signal (or may stop the output of the overdischarge detection signal) upon a recovery from an overdischarge state to an ordinary state. The recovery from the overdischarge state to the ordinary state is determined when the cell voltage equal to or higher than an overdischarge recovery voltage Vrel2, which is set in response the threshold voltage data read out of the memory 60, is detected. The overdischarge recovery voltage Vrel2 is higher than the overdischarge detection voltage Vdet2.

The logic circuit 44, which detects the overdischarge recovery signal or detects the stopped output of the overdischarge detection signal, outputs a control signal of a high level, which causes the transistor 12 to be turned on, from the discharge control terminal 94. By turning on the transistor 12, the overdischarge protection operation ends. The logic circuit 44 causes the transistor 12 to be turned on by turning on the transistor 48 and turning off the transistor 49.

For example, the protection operation circuit 98 performs an operation (a discharge overcurrent protection operation) of protecting the secondary battery 200 from a discharge overcurrent. For example, the discharge overcurrent detection circuit 32 monitors a voltage P− between the load connection terminal 6 and the cell connection terminal 4 by detecting a voltage between the current detection terminal 95 and the ground terminal 92. The discharge overcurrent detection circuit 32 outputs a discharge overcurrent detection signal upon a detection of the discharge overcurrent as an anomalous current flowing through the load connection terminal 6. The detection of the discharge overcurrent is determined by a detection of the voltage P− equal to or higher than a discharge overcurrent detection voltage Vdet3, which is set in response to the threshold voltage data read out of the memory 60. The detection of the voltage P− equal to or higher than the discharge overcurrent detection voltage Vdet3 and the output of the discharge overcurrent detection signal are performed by using a reference voltage 34 and a comparator 33.

The logic circuit 44 performs a discharge overcurrent protection operation of outputting a control signal of a low level, which causes the transistor 12 to be turned off, after a passage of a discharge overcurrent detection delay time tVdet3, which is set in response to the delay time data read out of the memory 60, after detecting the discharge overcurrent detection signal. It is possible to prevent an overcurrent from flowing in a direction of discharging the secondary battery 200 regardless of the on or off state of the transistor 11 when the transistor 12 is turned off.

The reason why the voltage P− increases when the discharge current discharging the secondary battery 200 in a state where at least the transistor 12 is turned on is that a voltage increases by an on-state resistance of the transistor 12.

For example, the protection operation circuit 98 performs an operation (a charge overcurrent protection operation) of protecting the secondary battery 200 from a charge overcurrent. For example, the charge overcurrent detection circuit 35 monitors the voltage P− between the load connection terminal 6 and the cell connection terminal 4 by detecting the voltage between the current detection terminal 95 and the ground terminal 92. The charge overcurrent detection circuit 35 outputs a charge overcurrent detection signal upon a detection of the charge overcurrent as an anomalous current flowing through the load connection terminal 6. The detection of the charge overcurrent is determined by a detection of the voltage P− equal to or lower than a charge overcurrent detection voltage Vdet4, which is set in response to the threshold voltage data read out of the memory 60. The detection of the voltage P− equal to or lower than the charge overcurrent detection voltage Vdet4 and the output of the charge overcurrent detection signal are performed by using a reference voltage 37 and a comparator 36.

The logic circuit 44 performs a charge overcurrent protection operation of outputting a control signal of a low level, which causes the transistor 11 to be turned off, after a passage of a charge overcurrent detection delay time tVdet4, which is set in response to the delay time data read out of the memory 60, after detecting the charge overcurrent detection signal. It is possible to prevent an overcurrent from flowing in a direction of charging the secondary battery 200 regardless of the on or off state of the transistor 12 when the transistor 11 is turned off.

The reason why the voltage P− decreases when the charge current charging the secondary battery 200 in a state where at least the transistor 11 is turned on is that a voltage decreases by the on-state resistance of the transistor 11.

For example, the protection operation circuit 98 performs an operation (a short-circuit protection operation) of protecting the secondary battery 200 from a short-circuit current. For example, the short-circuit detection circuit 38 monitors the voltage P− between the load connection terminal 6 and the cell connection terminal 4 by detecting the voltage between the current detection terminal 95 and the ground terminal 92.

The short-circuit detection circuit 38 outputs a short-circuit detection signal upon a detection of the short-circuit between the load connection terminal 5 and the load connection terminal 6. The detection of the short-circuit is determined by a detection of the voltage P− equal to or higher than a short-circuit detection voltage Vshort, which is set in response to the threshold voltage data read out of the memory 60. The detection of the voltage P− equal to or higher than the short-circuit detection voltage Vshort and the output of the short-circuit detection signal are performed by using a reference voltage 40 and a comparator 39.

The short-circuit detection signal is output from a delay circuit 41 after a passage of a short-circuit detection delay time tshort after being input into the delay circuit 41. The short-circuit detection delay time tshort is a time set in response to the delay time data read out of the memory 60.

The logic circuit 44 which detects the short-circuit detection signal through the delay circuit 41 performs a short-circuit protection operation of outputting a control signal of a low level, which causes the transistor 12 to be turned off, from the discharge control terminal 94. It is possible to prevent a short-circuit current from flowing in a direction of discharging the secondary battery 200 regardless of the on or off state of the transistor 11 when the transistor 12 is turned off.

The protection operation circuit 98 may have a function of switching an operation mode of the protection circuit 120 from an ordinary operation mode through an overdischarge protection mode to a standby mode, and a function of switching the operation mode of the protection circuit 120 from the standby mode through the overdischarge protection mode to the ordinary operation mode.

The logic circuit 44 outputs a control signal of a high level, which causes the transistor 11 to be turned on, from the charge control terminal 93 and a control signal of a high level, which causes the transistor 12 to be turned on, from the discharge control terminal 94 in the ordinary operation mode. Further, the logic circuit 44 turns off both the transistor 50 and the transistor 53 in the ordinary operation mode.

In the overdischarge protection mode, the above overdischarge protection operation described above is performed. The logic circuit 44 outputs the control signal, which causes the transistor 12 to be turned off, from the discharge control terminal 94, turns on the transistor 50, and turns off the transistor 53 in the overdischarge protection mode. By turning on the transistor 50, the current detection terminal 95 is pulled up to be a power-supply voltage of the power source terminal 91 through the resistor 51. By pulling up the current detection terminal 95 so as to have the power-supply voltage of the power source terminal 91, a voltage between the load connection terminal 5 and the load connection terminal 6 substantially becomes 0 volts. Therefore, it is possible to stop an operation of a load (not illustrated) connected to the load connection terminals 5 and 6, and it is possible to restrict a discharge current load flowing from the secondary battery 200 to the load.

Further, the logic circuit 44 detects a voltage between the current detection terminal 95 and the ground terminal 92 in the overdischarge protection mode so as to detect the voltage P− between the load connection terminal 6 and the cell connection terminal 4. Thus, it is possible to determine whether the charger is connected to the load connection terminals 5 and 6.

In a case where a voltage P− higher than a standby threshold voltage Vstb is detected in the overcurrent protection mode, the logic circuit 44 determines that the charger is not connected. Then, the logic circuit 44 switches the operation mode of the protection circuit 120 from the overcurrent protection mode to the standby mode. On the other hand, in a case where a voltage P− lower than the standby threshold voltage Vstb is detected in the overcurrent protection mode, the logic circuit 44 determines that the charger is connected. Then, the logic circuit 44 does not switch the operation mode of the protection circuit 120 from the overcurrent protection mode to the standby mode. The standby threshold voltage Vstb is set to be, for example, (VDD-0.9) or ½×VDD. VDD represents the input voltage of the power source terminal 91.

By causing the operation mode of the protection circuit 120 to transit from the overdischarge protection mode to the standby mode, it is possible to prevent the secondary battery 200 from being further discharged by a consumption current of the protection circuit 120.

For example, when overdischarge is detected in a state where the charger is not connected, the current detection terminal 95 is pulled up to a power-supply voltage of the power source terminal 91 so that the operation mode of the protection circuit 120 is switched to the standby mode. When the charger is connected in the standby mode, the operation mode of the protection circuit 120 is switched to the overdischarge protection mode so that the secondary battery 200 is charged by the charger. When a cell voltage equal to or greater than an overcharge recovery voltage Vrel2 is detected by an overdischarge detection circuit 27, the logic circuit 44 outputs a control signal for turning on the transistor 12 from the discharge control terminal 94 and switches the transistor 50 from on to off. Said differently, the operation mode of the protection circuit 120 is switched to the ordinary operation mode.

Further, the logic circuit 44, which has detected the discharge overcurrent detection signal or the short-circuit detection signal, outputs a control signal of a low level, which causes the transistor 12 to be turned off, from the discharge control terminal 94 and may turn off the transistor 50 and turn on the transistor 53. By turning on the transistor 53, the current detection terminal 95 is pulled down to be a ground voltage of the ground terminal 92 through the resistor 52. However, because a load for causing the discharge overcurrent or the short-circuit current to be generated is connected to the load connection terminals 5 and 6, the voltage P− is pulled up to the voltage of the load connection terminal 5.

When the load causing the discharge overcurrent or the short-circuit current is disconnected from the load connection terminals 5 and 6, the discharge overcurrent or the short-circuit current disappear. Then, the voltage P− is pulled up to the ground voltage of the ground terminal 92 by turning on the transistor 53. With this, the logic circuit 44 deactivates the discharge overcurrent protection operation or the short-circuit protection operation. Said differently, by providing the transistor 53, an automatic recovery from the discharge overcurrent protection operation or the short-circuit protection operation is enabled.

The above overcharge detection voltage Vdet1 or the above overcharge recovery voltage Vrel1 are examples of a threshold voltage used to determine whether the overcharge protection operation is necessary. Threshold voltage data for setting the overcharge detection voltage Vdet1 or the overcharge recovery voltage Vrel1 are examples of characteristics data previously written in the memory 60 and read out of the memory to the overcharge detection circuit 22 by the read write control circuit 80. A similar operation is applicable to threshold voltage data for setting the overdischarge detection voltage Vdet2, the overcharge recovery voltage Vrel2, the discharge overcurrent detection voltage Vdet3, the charge overcurrent detection voltage Vdet 4, the short-circuit detection voltage Vshort, and the standby threshold voltage Vstb.

Therefore, by changing the contents of the threshold voltage data written in the memory 60 for setting the overcharge detection voltage Vdet1, the overcharge detection voltage Vdet1 can be changed to have a protection voltage value corresponding to the contents. For example, the overcharge detection circuit 22 or the read write control circuit 80 includes a threshold voltage setup circuit which sets the overcharge detection voltage Vdet1 to be the threshold voltage data of the overcharge detection voltage Vdet1 by changing at least one of the resistance value of the resistor 23, the resistance value of the resistor 24, and the voltage value of the reference voltage 26 based on the threshold voltage data of the overcharge detection voltage Vdet1 read out of the memory 60. A similar operation is applicable to the overcharge recovery voltage Vrel1, the overdischarge detection voltage Vdet2, the overcharge recovery voltage Vrel2, the discharge overcurrent detection voltage Vdet3, the charge overcurrent detection voltage Vdet 4, the short-circuit detection voltage Vshort, and the standby threshold voltage Vstb.

The above overcharge detection delay time tVdet1 is generated by the oscillator 43 and the counter 42 based on the delay time data read out of the memory 60. The overcharge detection delay time tVdet1 is a time after a cell voltage equal to or higher than the overcharge detection voltage Vdet1 is detected by the overcharge detection circuit 22 until the overcharge protection operation is performed. The delay time data for setting the overcharge detection delay time tVdet1 are an example of the characteristics data written into the memory 60, and read out to the logic circuit 44 or the counter 42 from the memory 60 by the read write control circuit. A similar operation is applicable to delay time data for setting the overdischarge detection delay time tVdet2, the discharge overcurrent detection delay time tVdet3, the charge overcurrent detection delay time tVdet4, and the short-circuit detection delay time tshort.

The delay time data for setting the short-circuit detection delay time tshort may be read out of the memory 60 to the delay circuit 41 by the read write control circuit 80.

Therefore, by changing the contents of the delay time data written in the memory 60 for setting the overcharge detection delay time tVdet1, the overcharge detection delay time tVdet1 can be changed to have a time corresponding to the contents. For example, the logic circuit 44 or the counter 42 includes a delay time setup circuit which sets the overcharge detection delay time tVdet1 to be the delay time data of the overcharge detection delay time tVdet1 by changing to a delay time generated by the counter 42 based on the delay time data of the overcharge detection delay time tVdet1 read out of the memory 60. A similar operation is applicable to the overdischarge detection delay time tVdet2, the discharge overcurrent detection delay time tVdet3, the charge overcurrent detection delay time tVdet4, and the short-circuit detection delay time tshort.

The counter 42 includes a circuit where multiple flip-flops are connected in series and can generate multiple different delay times by selecting output points respectively of the flip-flops based on the delay time data read out of the memory 60. The counter 42 is operated in conformity with a clock from the oscillator 43.

The delay circuit 41 may include a delay time setup circuit setting the short-circuit detection delay time tshort to the delay time data of the short-circuit detection delay time tshort by changing a time constant of a first-order lag circuit inside the delay circuit 41 based on the delay time data of the circuit detection delay time tshort read out of the memory 60.

The protection operation circuit 98 may perform a protection operation of the secondary battery 200 based on option selection data read out of the memory 60. The option selection data determining an option function of a protection operation for the secondary battery 200 are an example of the characteristics data 200 written in the memory 60. The option selection data are read out of the memory 60 into the logic circuit 44 by the read write control circuit 80.

Therefore, the logic circuit 44 can determine whether a predetermined option function is selected based on the contents of the option selection data read out of the memory 60. For example, the logic circuit 44 can determine whether a charge permission selection circuit 45 is validated or invalidated based on the contents of the option selection data read out of the memory 60.

The charge permission selection circuit 45 is an exemplary option circuit for selecting whether it is permitted to charge the secondary battery 200 having the cell voltage lower than a predetermined value (whether a "0V charge" is permitted). The charge permission selection circuit 45 stops to charge the secondary battery 200 by turning off the transistor 11 and permits to charge the secondary battery 200 by turning on the transistor 11.

The logic circuit 44 of the protection operation circuit 98 may determine whether an option function other than a charge permission selection function of the charge permission selection circuit 45 is selected based on option selection data read out of the memory 60. For example, the logic circuit 44 can determine whether a pulse charge function is validated or invalidated based on the option selection data read out of the memory 60.

Figure 2:
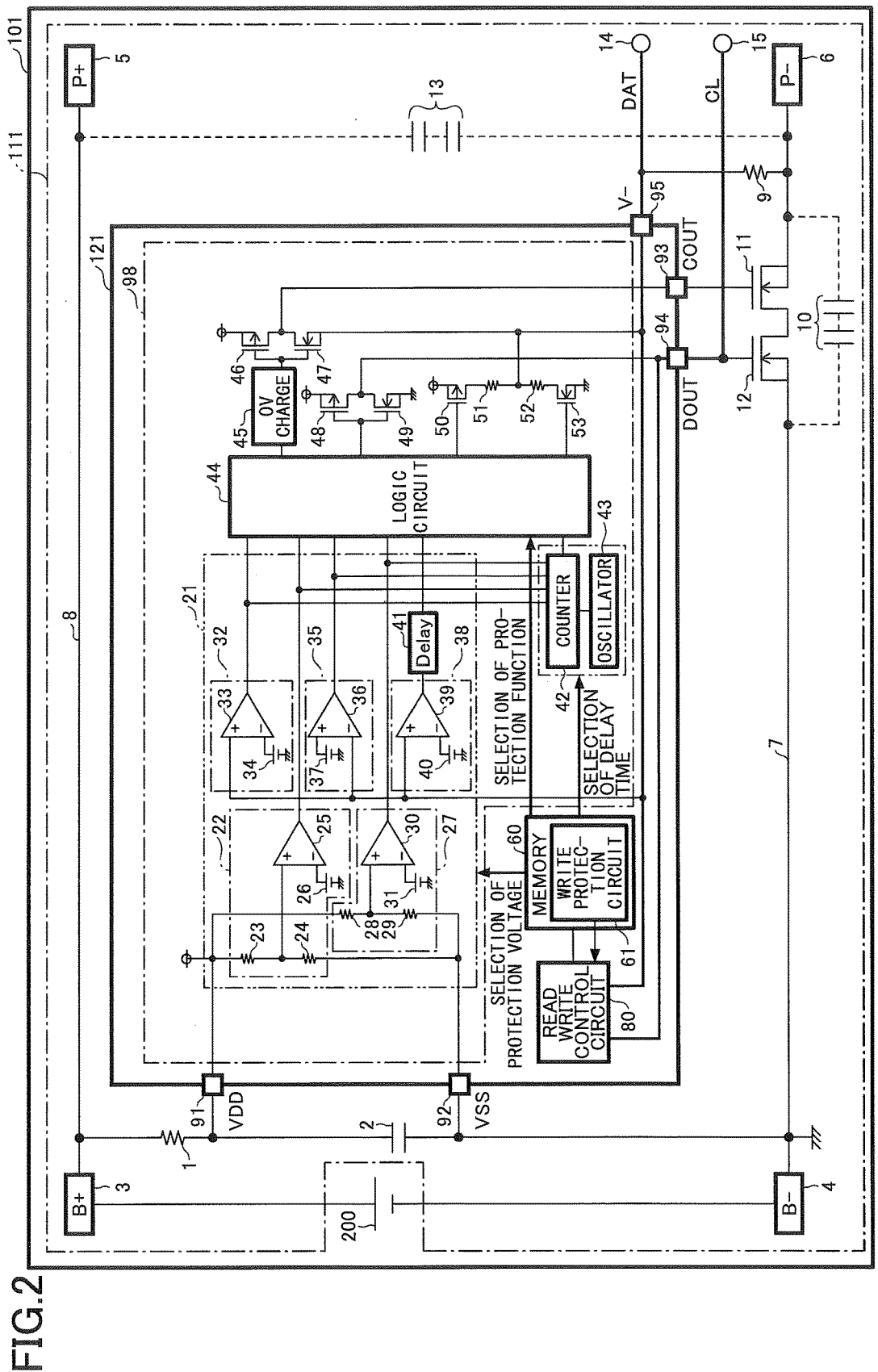
FIG. 2 illustrates a structure of the exemplary battery pack.

FIG. 2 illustrates a structure of the exemplary battery pack 101. The battery pack 101 includes the secondary battery 200 and a protection apparatus 111 for protecting the secondary battery 200. The protection apparatus 111 includes transistors 11 and 12 and a protection circuit 121. The structure and effects illustrated in FIG. 2 are similar to the structure and effects illustrated in FIG. 1. Therefore, description of the structure and effects illustrated in FIG. 1 are applied to the structure and effects illustrated in FIG. 2.

A write terminal for writing the characteristics data into the memory 60 may be used in common with at least one terminal among multiple protection terminals including a charge control terminal 93, a discharge control terminal 94, and a current detection terminal 95. By using the write terminal in common with the protection terminal of the secondary battery 200, it is possible to reduce the area of the protection circuit.

Referring to FIG. 2, the current detection terminal 95 can input not only a detection voltage corresponding to the current flowing through the secondary battery 200 but also a characteristics data signal DAT. The discharge control terminal 94 cannot only output a signal of prohibiting to discharge the secondary battery 200 but also can input a clock signal CL.

Because the current detection terminal 95 has a detection part detecting a voltage input into the current detection terminal 95, a part of the detection part can be used to detect the characteristics data signal DAT. Therefore, the area of the protection circuit can be efficiently reduced. Because the durability of the discharge control terminal 94 is lower than the durability of the charge control terminal 93, if the output of the discharge prohibiting signal and the input of the clock signal CL are used in common, it is possible to prevent a circuit size from increasing.

The common use of the protection terminals used to write the characteristics data to the memory 60 is not limited to a combination illustrated in FIGS. 1 and 2 but may be another combination. For example the characteristics data signal DAT may be input into the charge control terminal 93 and the clock signal CL may be input into the current detection terminal 95.

Figure 3:
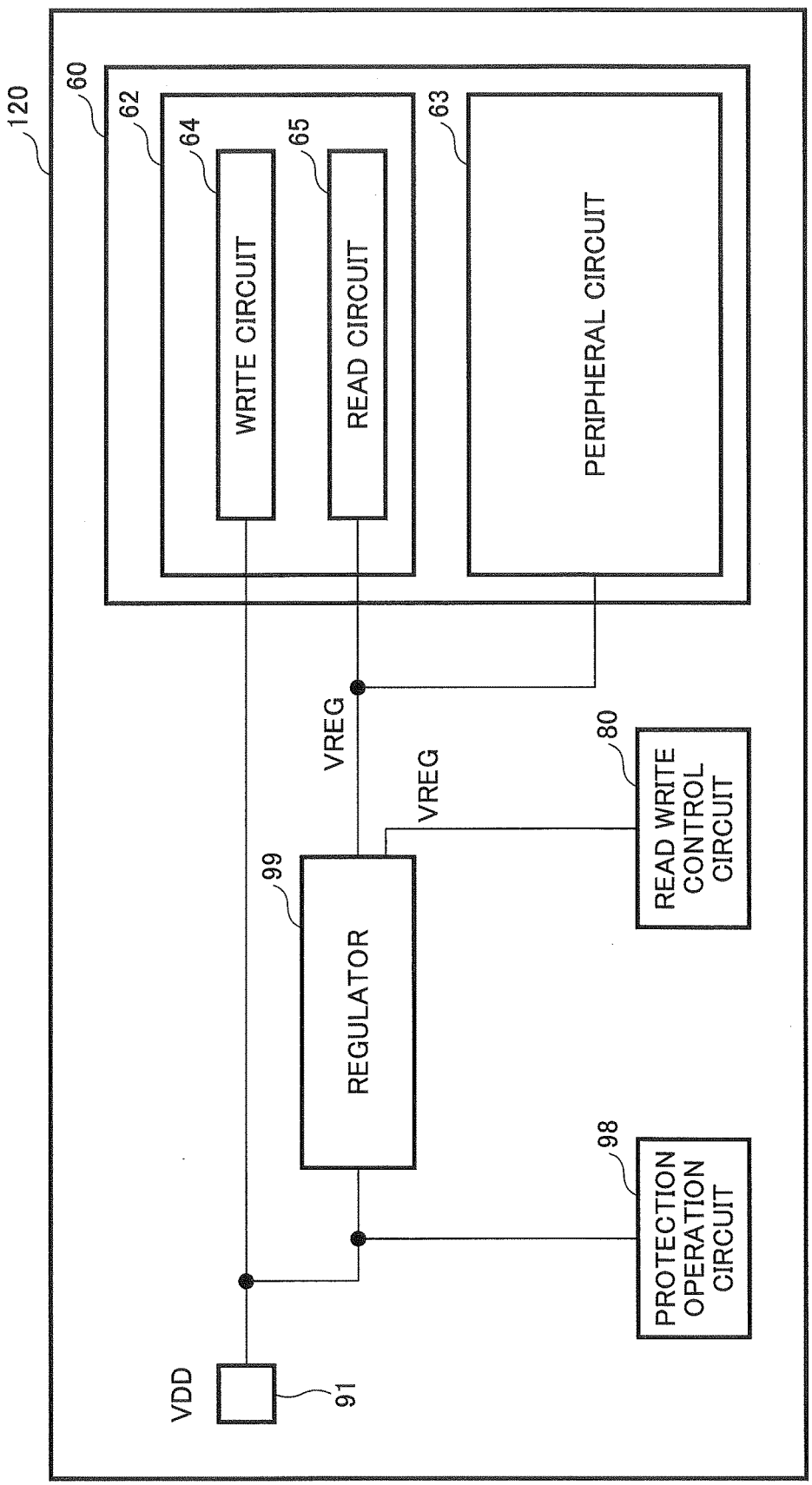
FIG. 3 illustrates a structure of an exemplary battery circuit.

FIG. 3 illustrates a structure of an exemplary protection circuit 120 illustrated in FIG. 1. The following description of FIG. 3 may be applied to a protection circuit of another embodiment (For example, the protection circuit illustrated in FIG. 2).

The protection circuit 120 includes the memory 60. The memory 60 includes a memory cell circuit 62 and a peripheral circuit 63 positioned around the memory cell circuit 62. The memory cell circuit 62 includes a write circuit 64 writing the characteristics data input from the write terminal into the memory element and a read circuit 65 reading the characteristics data from the memory element. The peripheral circuit 63 is a circuit including a logic circuit controlling a write operation performed by the write circuit 64 or a read operation performed by the read circuit 65.

The protection circuit 120 includes a regulator 99 in addition to the structure illustrated in FIG. 1. The regulator 99 is a circuit regulating an input voltage VDD input into the power source terminal 91 and outputs a constant voltage VREG. The input voltage VDD is supplied to not only the regulator 99 but also the write circuit 64 and the protection operation circuit 98.

Because the read circuit 65 and the peripheral circuit 63 are operated at an ordinary operating voltage, the constant voltage VREG generated by regulating the input voltage VDD by the regulator 99 is supplied to the read circuit 65 and the peripheral circuit 63. The constant voltage VREG is supplied to the read write control circuit 80.

Meanwhile, because the memory element is broken down at a time of writing the characteristics data in the write operation, it is necessary to apply a voltage higher than the ordinary operating voltage for the protection circuit 120 and the memory 60 to the memory element inside the write circuit 64. Therefore, the write circuit 64 writes the characteristics data input from the write terminal to the memory element when a write voltage higher than the constant voltage VREG generated by the regulator 99 is supplied to the write circuit 64.

Because the regulator 99 regulates the input voltage VDD from the power source terminal 91 to be the constant voltage VREG, a write voltage higher than the ordinary operating voltage for the protection circuit 120 and the memory 60 may be input from the power source terminal 91. If the write voltage is input into the power source terminal 91, the regulator 99 regulates the write voltage input from the power source terminal 91 and outputs the constant voltage VREG. Thus, it becomes possible to supply the write voltage input from the power source terminal 91 to the write circuit 64, and it becomes possible to supply the constant voltage VREG lower than the write voltage input from the power source terminal 91 to the read circuit 65 and the peripheral circuit 63. Further, it is unnecessary to provide a dedicated write terminal, into which the write voltage is input, in addition to the power source terminal 91 by providing the regulator 99. Therefore, it is possible to prevent an expansion of the circuit size of the protection circuit 120 caused by an increase of the number of the terminals.

Figure 4:
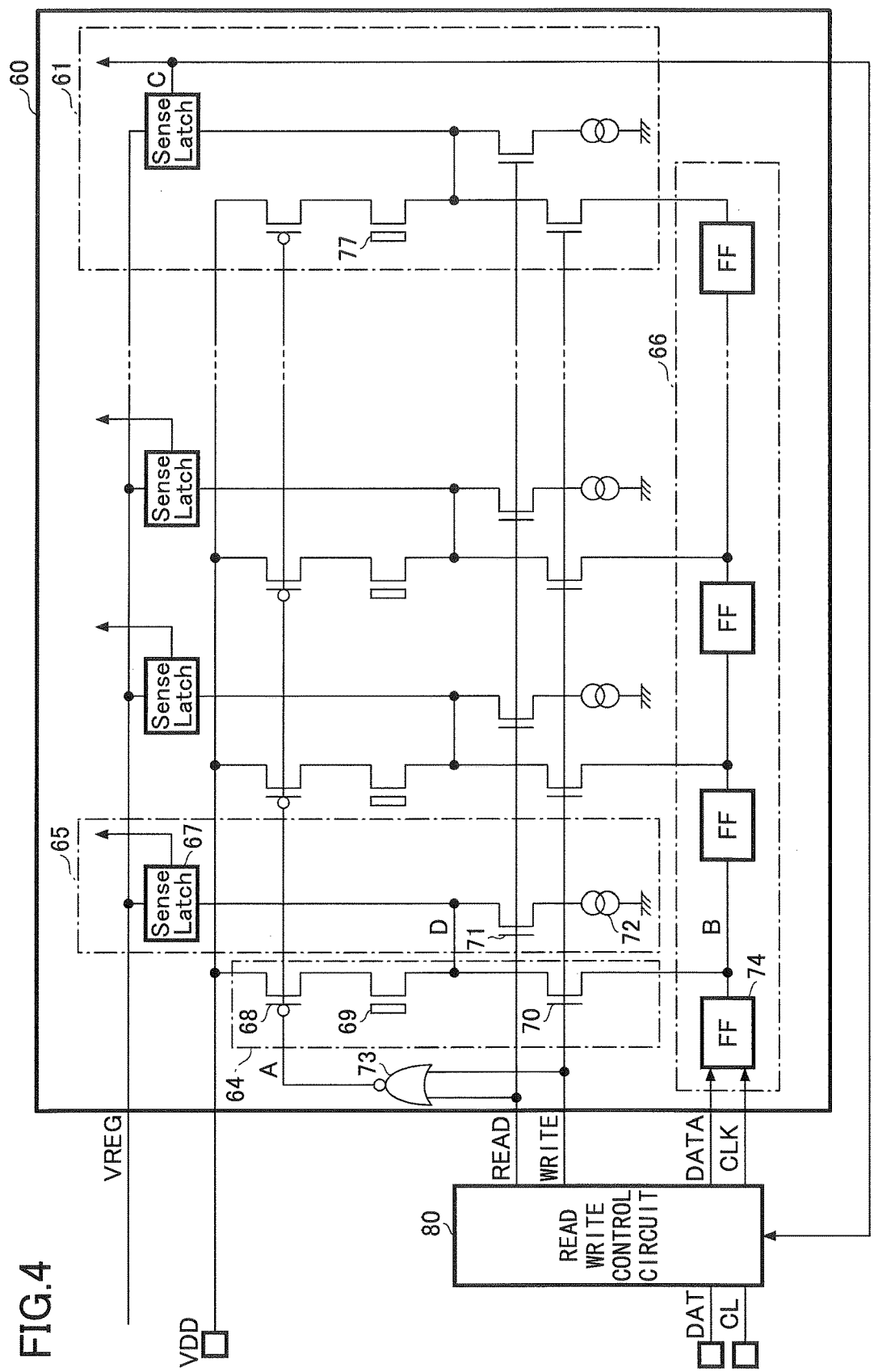
FIG. 4 illustrates a structure of an exemplary non-volatile memory.

FIG. 4 illustrates a structure of an exemplary memory 60. The memory 60 includes multiple write circuits 64 to which the write voltage is supplied, multiple read circuits 65 to which the constant voltage VREG is supplied, a NOR gate 73, and a shift register 66. The NOR gate 73 and the shift register 66 are circuits included in the above peripheral circuit 63. The shift register 66 includes a sequential circuit in which multiple flip-flops (FF) are connected in series. Referring to FIG. 4, one of the write circuits 64 and one of the read circuits 65 are surrounded by a dot chain line.

Each of the multiple write circuits 64 is a circuit in which a switch 68, a memory element 69, and a switch 70 are connected in series. The switch 68 is arranged between a supply route for the write voltage and the memory element 69, and the switch 70 is arranged between an output part of the flip-flop 74 of the shift register 66 and the memory element 69. For example, the switch 68 is a p-channel MOSFET, the memory element 69 is an OTP element, and a switch 70 is an n-channel MOSFET.

Each of the multiple read circuits 65 includes a sense latch circuit 67, a switch 72, and a constant current source 72. For example, the sense latch circuit 67 is a flip-flop, and the switch 71 is an n-channel MOSFET.

The read write control circuit 80 converts a characteristics data signal DAT carrying the characteristics data into a characteristics data internal signal DATA and converts an external clock signal CL to a clock internal signal CLK. The read write control circuit 80 generates a write signal (WRITE) instructing to write the characteristics data to the memory element 69 based on the characteristics data signal DAT and the clock signal CL. The read write control circuit 80 generates a read signal (READ) instructing to read the characteristics data out of the memory element 69 when the input voltage VDD exceeds a predetermined startup voltage.

Figure 5:
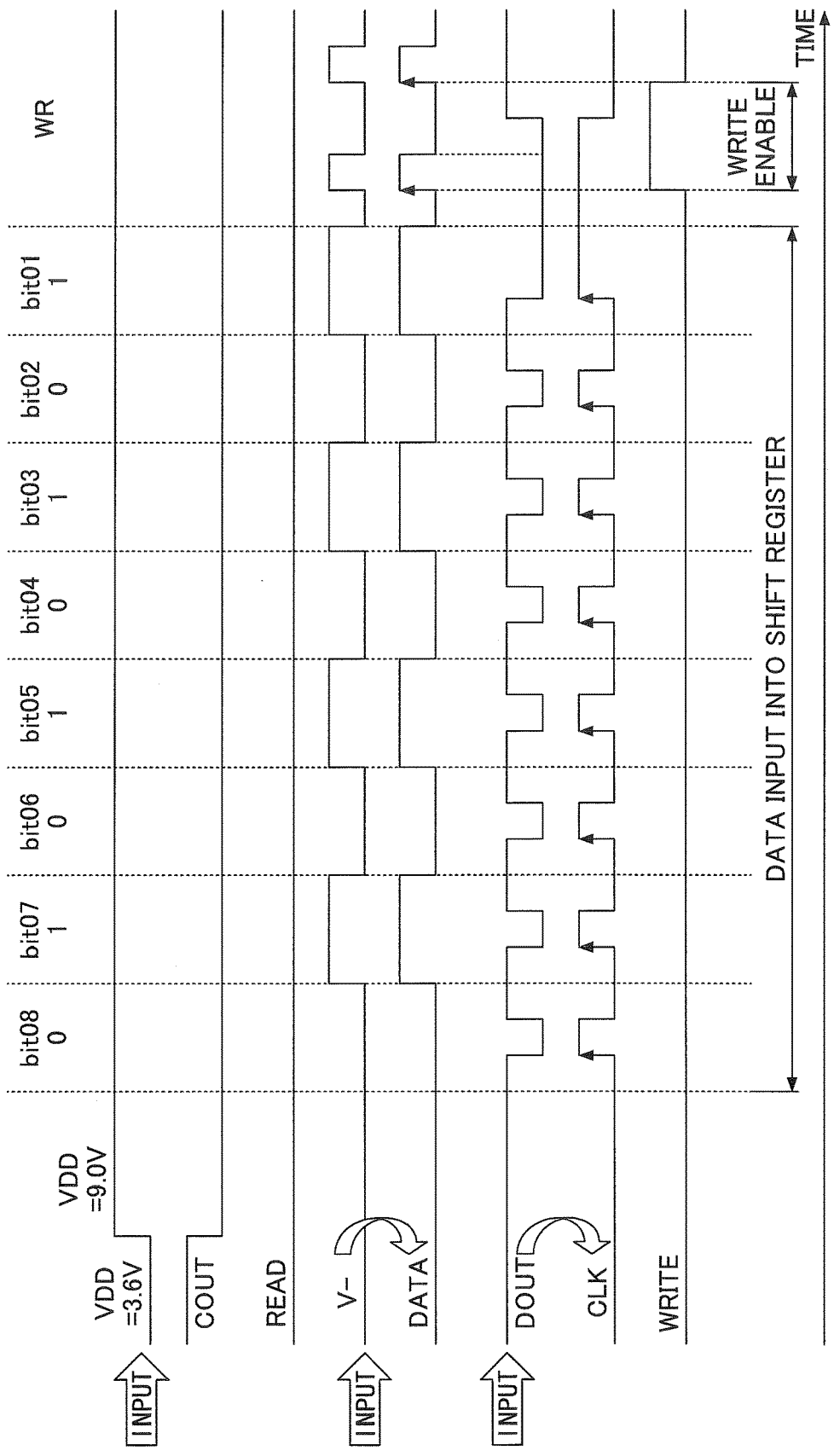
FIG. 5 illustrates a timing chart indicative of an exemplary write operation.

Referring to FIG. 5, described next is an exemplary write operation in the structure illustrated in FIG. 4. FIG. 5 is a timing chart indicative of an exemplary write operation in the structure illustrated in FIGS. 2, 3, and 4.

In an initial state, the levels of READ and WRITE are a low level (READ=WRITE=L). In this case, the switch is turned off because the gate potential A of the switch 68 is a high level. Because an output potential B of each flip-flop 74 of the shift register 66 is a high level, the switch is turned off. Therefore, in the initial state, the memory element 69 is in an unwritten state where the characteristics data are not written.

In a case where the write operation is performed, the input voltage VDD increases from an ordinary operating voltage (for example, 3.6 V) to a write voltage (for example, 9V). When the input voltage VDD increases to be the write voltage, the overcharge is detected by the overcharge detection circuit 22. With this, the control signal output from the charge control terminal 93 to the gate of the transistor 11 changes from the high level of turning on the transistor 11 to the low level of turning off the transistor 11. On the other hand, the control signal output from the discharge control terminal 94 to the gate of the transistor 12 remains to be the high level.

When the characteristics data internal signal DATA and the clock internal signal CLK are input from the read write control circuit 80 to the shift register 66, each flip-flop 74 outputs the low level in conformity with the input characteristics data internal signal DATA.

During a write enable period while the characteristics data are enabled to be written into the memory element 69, because the level of READ is the low level (READ=L) and the level of WRITE is the high level (WRITE=H), the gate potential A of the switch 68 is the low level. During the write enable period, the switch 68 is turned on, the switch 71 is turned off, and the switch 70 is turned on.

In a case where an output potential B of the shift register 66 is the low level during the write enable period, a write voltage is applied to the memory element 69 so that an electric current flows through the memory element 69 which in in an off state. Then, electrons are trapped by a floating gate so that the memory element 69 becomes the on state (the characteristics data are written into the memory element 69).

Meanwhile, in a case where the output potential B of the shift register 66 is the high level during the write enable period, the switches 68 and 70 are turned on. However, because the voltage between the drain and the source is substantially 0 volt, the electric current does not flow through the memory element 69. Said differently, an off state of the memory element 69 is maintained (the characteristics data are not written into the memory element 69).

The read write control circuit 80 switches the level of WRITE to the low level so as to turn off the switch 70. With this, the write enable period ends.

Described next is an exemplary read operation in the structure illustrated in FIG. 4.

In a case where the read operation is performed, the input voltage VDD is the ordinary operating voltage (for example, 3.6V). The read write control circuit 80 switches the level of READ to the high level so as to make the gate potential A of the switch 68 the low level. Said differently, during the read period while the characteristics data are read out of the memory element 69, the switch 68 is turned on, the switch 71 is turned on, and the switch 70 is turned off.

In a case where the characteristics data are not written in the memory element 69 in the read period, the sense latch circuit 67 latches a memory output potential D of the low level. In a case where the characteristics data are written in the memory element 69 in the read period, the sense latch circuit 67 latches a memory output potential D of the high level.

The read write control circuit 80 switches the level of READ to the low level so as to make the gate potential A of the switch 68 the high level and turn off the switch 68. Thus, the read period ends.

Referring to FIGS. 1, 2, and 4, the memory 60 may include a write prevention circuit 61 for preventing a write after writing the characteristics data. By a write prevention operation performed by the write prevention circuit 61, it is possible to prevent the characteristics data stored in the memory 60 from being written over. In a case where the characteristics data are written into a part of the memory elements 69 and are not written into the rest of the memory elements 69, it is possible to prevent the characteristics data from being written in the rest of the memory elements 69.

For example, referring to FIG. 4, the write prevention circuit 61 has the same circuit structure as the write circuit 64 and the read circuit 65 and includes a protection bit 77. Data are written into the protection bit 77 after writing the characteristics data into the memory element 69 based on WRITE received from the read write control circuit 80. After the data are written into the protection bit 77, the write prevention circuit 61 outputs a write lock signal of disabling a write of the characteristics data into the memory element 69 to the read write control circuit 80. For example, the read write control circuit 80 fixes the level of WRITE to the low level when the write lock signal is input. With this, the write of the characteristics data to the memory element 69 is disabled. When the write lock signal in input, the read write control circuit 80 may fix the level of WRITE to the low level and invalidate a write signal including at least one of the characteristics data signal DAT and the clock signal CL.

Figure 6:
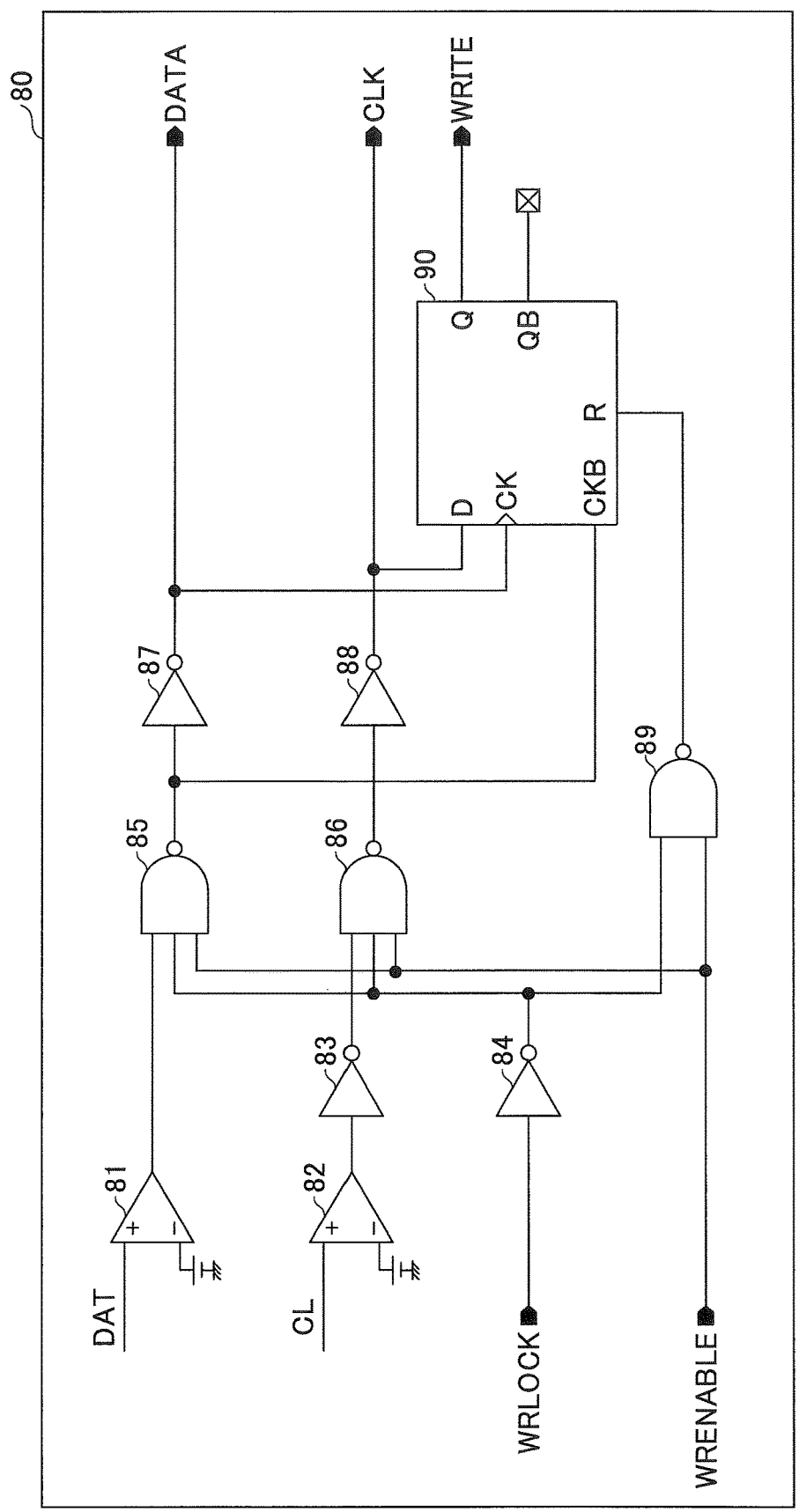
FIG. 6 illustrates a structure of an exemplary read write control circuit.

FIG. 6 illustrates a structure of an exemplary read write control circuit 80. The write lock signal (WRLOCK) is output from an output point C (see FIG. 4) of the sense latch circuit 67 of the write prevention circuit 61. A write enable signal (WRENABLE) is the low level when the input voltage VDD is the ordinary operating voltage, and is the high level when the input voltage VDD is the write voltage.

The read write control circuit 80 includes a comparator 81 to which the characteristics data signal DAT is input and a comparator 82 to which the clock signal CL is input. Further, the read write control circuit 80 includes a read write logic circuit generating the characteristics data internal signal DATA, the clock internal signal CLK, and the write signal WRITE based on the characteristics data signal DAT, the clock signal CL, the write lock signal WRLOCK, and the write enable signal WRENABLE. For example, the read write logic circuit includes inverters 83, 84, 87, and 88, NAND gates 85, 86, and 89, and a flip-flop 90.

In a case where the input voltage VDD is equal to the write voltage and the data are not written into the protection bit 77, the level of WRLOCK becomes the low level of the output point C and the level of WRENABLE becomes the high level. In this case, because a signal of the low level is input into a reset terminal R of the flip-flop 90 by the inverter 84 and the NAND gate 89, the flip-flop 90 is operated. Based on the combination of the characteristics data signal DAT and the clock signal CL, WRITE of the high level is output as described above. With this, the write into the memory element 69 is enabled.

Meanwhile, in a case where the input voltage VDD is equal to the write voltage and the data are not written into the protection bit 77, the level of WRLOCK becomes the high level by the high level of the output point C and the level of WRENABLE becomes the high level. In this case, because a signal of the high level is input into the reset terminal R of the flip-flop 90 by the inverter 84 and the NAND gate 89, the flip-flop 90 does not operate. Said differently, WRITE output from a Q terminal of the flip-flop 90 is fixed to the low level. Further, because the signal of the low level is input into the NAND gates 85 and 86, the characteristics data internal signal DATA output from the inverter 87 and the clock internal signal CLK output from the inverter 88 are fixed to the low level. Said differently, WRITE output from the Q terminal of the flip-flop 90 is fixed to the low level. With this, the write into the memory element 69 is disabled.

Within the embodiment, multiple different protective characteristics can be achieved by a circuit structure used in common.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the battery protection circuit has been described in detail, it should be understood that the various changes, substitutions, and alterations could be made hereto without departing from the spirit and scope of the invention.

For example, the battery protection circuit or the battery protection apparatus may be used in a mode other than the battery pack. For example, the battery protection circuit or the battery protection apparatus may not be built in the battery pack and may be attached to a target product.

Further, a writing type of writing the characteristics data to the memory is not limited to a two-wire type and may be other than the two-wire type (for example, a one-wire type or a three-wire type). Therefore, the number of the protection terminals used in common to write the characteristics data is not limited to two and may be one or three.

What is claimed is:

1. A battery protection circuit for protecting a secondary battery, the battery protection circuit not having a CPU, the battery protection circuit comprising:
    a non-volatile memory into which characteristics data determining protective characteristics of the battery protection circuit are writable, said non-volatile memory including a write circuit provided to write the characteristics data into a memory element and a read circuit provided to read the characteristics data from the memory element;
    a protection operation circuit which performs a protection operation of the secondary battery based on the characteristics data read out of the non-volatile memory;
    a power source terminal that is directly connected to the write circuit so as to supply a write voltage to the write circuit, said write voltage for breaking down the memory element being higher than an operation voltage and provided to write the characteristics data into the non-volatile memory; and
    a regulator which is directly connected to the read circuit so as to directly output the operation voltage to the read circuit by regulating an input voltage input from the power source terminal, thereby operating the read circuit by the operation voltage,
    wherein the read circuit is connected to the power source terminal via the regulator, and
    wherein the power source terminal is only a terminal from which each of the input voltage and the write voltage is input.

2. The battery protection circuit according to claim 1, further comprising:
    a read write control circuit which is supplied with the operation voltage and controls to read or write the characteristics data.

3. The battery protection circuit according to claim 1, wherein the non-volatile memory includes a write prevention circuit which prevents the characteristics data from being written after the characteristics data are written into the non-volatile memory.

4. The battery protection circuit according to claim 1, wherein the characteristics data include at least one of
    threshold voltage data determining a threshold voltage used to determine whether the protection operation is necessary,
    delay time data determining a delay time after detecting the threshold voltage until performing of the protection operation, and
    option selection data determining an option function of the protection operation.

5. The battery protection circuit according to claim 1, wherein the battery protection circuit does not have a residual quantity detecting function for the secondary battery.

6. A battery protection apparatus comprising:
    the battery protection circuit according to claim 1;
    a charging line cutoff part which can cut off a charging path for the secondary battery; and
    a discharging line cutoff part which can cut off a discharging path for the secondary battery.

7. A battery pack comprising:
    the battery protection apparatus according to claim 6; and
    the secondary battery.

8. The battery protection circuit according to claim 1, wherein the operation voltage includes a power source voltage and an output voltage of the regulator, and the write voltage includes a voltage to break down the non-volatile memory.

9. The battery protection circuit according to claim 1, wherein the non-volatile memory includes the characteristics data determining the protective characteristics of the battery protection circuit that is changeable so as to perform the protection operation regardless of a type of the secondary battery or a product to which the battery protection circuit is employed.

10. The battery protection circuit according to claim 1, wherein the memory element of the write circuit is configured to be broken down by the write voltage that is higher than the operation voltage to be provided to the read circuit.

11. The battery protection circuit according to claim 1, wherein the input voltage input from the power source terminal is directly applied to the write circuit as the write voltage.

12. The battery protection circuit according to claim 1, wherein the regulator is not directly connected to the write circuit.

13. A battery protection circuit for protecting a secondary battery, the battery protection circuit not having a CPU, the battery protection circuit comprising:
  a non-volatile memory into which characteristics data determining protective characteristics of the battery protection circuit are writable, said non-volatile memory including a write circuit provided to write the characteristics data into a memory element and a read circuit provided to read the characteristics data from the memory element;
  a protection operation circuit which performs a protection operation of the secondary battery based on the characteristics data read out of the non-volatile memory;
  a charge control terminal which outputs a signal for stopping to charge the secondary battery;
  a discharge control terminal which outputs a signal for stopping to discharge the secondary battery;
  a current detection terminal into which a detection voltage corresponding to an electric current flowing through the secondary battery is input,
  a power source terminal that is directly connected to the write circuit so as to supply a write voltage to the write circuit, said write voltage for breaking down the memory element being higher than an operation voltage and provided to write the characteristics data into the non-volatile memory, and
  a regulator which is directly connected to the read circuit so as to directly output the operation voltage to the read circuit by regulating an input voltage input from the power source terminal, thereby operating the read circuit by the operation voltage,
  wherein the read circuit is connected to the power source terminal via the regulator,
  wherein the characteristics data input from at least one of the charge control terminal, the discharge control terminal, and the current detection terminal is written into the non-volatile memory, and
  wherein the power source terminal is only a terminal from which each of the input voltage and the write voltage is input.

14. A battery protection IC for protecting a secondary battery, the battery protection IC not having a CPU, the battery protection IC comprising:
  a non-volatile memory into which characteristics data determining protective characteristics of the battery protection IC are writable, said non-volatile memory including a write circuit provided to write the characteristics data into a memory element and a read circuit provided to read the characteristics data from the memory element;
  a protection operation circuit which performs a protection operation of the secondary battery based on the characteristics data read out of the non-volatile memory;
  a power source terminal that is directly connected to the write circuit so as to supply a write voltage to the write circuit, said write voltage for breaking down the memory element being higher than an operation voltage and provided to write the characteristics data into the non-volatile memory; and
  a regulator which is directly connected to the read circuit so as to directly output the operation voltage to the read circuit by regulating an input voltage input from the power source terminal, thereby operating the read circuit by the operation voltage,
  wherein the read circuit is connected to the power source terminal via the regulator, and
  wherein the power source terminal is only a terminal from which each of the input voltage and the write voltage is input.

15. The battery protection IC according to claim 14, further comprising:
  a read write control circuit which is supplied with the operation voltage and controls to read or write the characteristics data.

16. The battery protection IC according to claim 14, wherein the non-volatile memory includes
  a read circuit provided to read the characteristics data out of the memory element.

17. The battery protection IC according to claim 14, wherein the characteristics data is written into the non-volatile memory after packaging the battery protection IC so as to prevent the protective characteristics from varying due to the packaging.

18. The battery protection IC according to claim 14, wherein the characteristics data is written into the non-volatile memory after mounting the battery protection IC on a substrate so as to prevent the protective characteristics from varying due to the mounting.

19. A battery protection IC for protecting a secondary battery, the battery protection IC not having a CPU, the battery protection IC comprising:
  a non-volatile memory into which characteristics data determining protective characteristics of the battery protection IC are writable, said non-volatile memory including a write circuit provided to write the characteristics data into a memory element and a read circuit provided to read the characteristics data from the memory element;
  a protection operation circuit which performs a protection operation of the secondary battery based on the characteristics data read out of the non-volatile memory;
  a charge control terminal which outputs a signal for stopping to charge the secondary battery;
  a discharge control terminal which outputs a signal for stopping to discharge the secondary battery;
  a current detection terminal into which a detection voltage corresponding to an electric current flowing through the secondary battery is input,
  a power source terminal that is directly connected to the write circuit so as to supply a write voltage to the write circuit, said write voltage for breaking down the memory element being higher than an operation voltage and provided to write the characteristics data into the non-volatile memory, and a regulator which is directly connected to the read circuit so as to directly output the operation voltage to the read circuit by regulating an input voltage from the power source terminal, thereby operating the read circuit by the operation voltage, wherein the read circuit is connected to the power source terminal via the regulator, wherein the characteristics data input from at least one of the charge control terminal, the discharge control terminal, and the current detection terminal is written into the non-volatile memory, and wherein the power source terminal is only a terminal from which each of the input voltage and the write voltage is input.

* * * * *